May 23, 1950     H. H. RICHMOND     2,508,929
PROCESS FOR THE MANUFACTURE OF SULFAGUANIDINE
Filed April 8, 1948     2 Sheets-Sheet 1

*Fig. 1*

REACT ACETANILIDE WITH CHLOROSULFONIC ACID. DROWN REACTION MIXTURE IN ICE-WATER. ACETYLSULFANILYLCHLORIDE (A.S.C.) PRECIPITATES

↓

SEPARATE CRUDE A.S.C. CONTAINING LARGE QUANTITY OF WATER

↓

MIX CRUDE A.S.C. WITH SELECTED RELATIVELY WATER-IMMISCIBLE KETONE, AND PREFERABLY WITH AN INORGANIC SALT, e.g. NaCl or Na$_2$SO$_4$

↓

SEPARATE INTO AQUEOUS LAYER AND KETONE LAYER CONTAINING A.S.C. SEPARATE LAYERS

├──→ AQUEOUS LAYER

↓

KETONE LAYER CONTAINING A.S.C. USE DIRECTLY FOR PREPARATION OF p-ACETYLSULFANILYLGUANIDINE (A.S.G.) or SULFAGUANIDINE (S.G.) PER FIG. 2

INVENTOR.
HENRY H. RICHMOND
BY Robert J. Patterson
ATTORNEY

May 23, 1950     H. H. RICHMOND     2,508,929
PROCESS FOR THE MANUFACTURE OF SULFAGUANIDINE
Filed April 8, 1948     2 Sheets-Sheet 2

*Fig. 2*

MIXTURE OF CONCENTRATED AQUEOUS
ALKALI METAL HYDROXIDE, SELECTED KETONE
IMMISCIBLE THEREWITH AND GUANIDINE SALT

↓

ADD A.S.C. WITH STIRRING AND COOLING

↓

ADD WATER WITH CONTINUED STIRRING

↓

SEPARATE PRECIPITATED A.S.G. (OPTIONAL)

↓

REMOVE KETONE BY VACUUM
DISTILLATION AT LESS THAN 60°C.

→ Recovered Ketone

↓

HYDROLYZE A.S.G. TO S.G.
BY ADDING WATER AND ALKALI METAL HYDROXIDE
AND HEATING TO 60° TO 80° WITH STIRRING

↓

COOL

↓

SEPARATE
SULFAGUANIDINE PRODUCT → Mother Liquor Discarded

INVENTOR.
HENRY H. RICHMOND
BY
Robert J. Patterson
ATTORNEY

Patented May 23, 1950

2,508,929

UNITED STATES PATENT OFFICE 2,508,929

PROCESS FOR THE MANUFACTURE OF SULFAGUANIDINE

Henry H. Richmond, Guelph, Ontario, Canada, assignor to United States Rubber Company, New York, N. Y., a corporation of New Jersey Application April 8, 1948, Serial No. 19,703

14 Claims. (Cl. 260—397.7)

This invention relates to novel improvements in the manufacture of sulfaguanidine, particularly in that process for the manufacture of sulfaguanidine wherein p-acetylsulfanilylchloride is condensed with guanidine with subsequent removal of the acetyl group.

Sulfaguanidine has heretofore generally been made by the condensation of guanidine with p-acetylsulfanilylchloride using an aqueous solution of alkali metal hydroxide, generally sodium hydroxide, and a water-miscible organic liquid, such as acetone or isopropyl alcohol. The p-acetylsulfanilylguanidine formed by this reaction is then hydrolyzed, by heating with aqueous hydrochloric acid or with aqueous alkali metal hydroxide whereupon sulfanilylguanidine is recovered from the reaction mixture in any suitable way.

I have found that when the procedure outlined in the preceding paragraph is followed the yield of p-acetylsulfanilylguanidine formed by the condensation of guanidine and p-acetylsulfanilylchloride is in the neighborhood of 70 percent. I have found that the principal reason for this low yield is the formation of considerable bis - (acetylsulfanilyl) - guanidine as byproduct. Formation of this by-product can be avoided only to a small extent by limiting the quantity of p-acetylsulfanilylchloride used.

The principal object of the present invention is to provide a method of making p-acetylsulfanilylguanidine which avoids the disadvantageous low yield of prior art practice. Another object is to provide an improved method of making sulfaguanidine. Another object is to provide a novel and advantageous method of separating p-acetylsulfanilylchloride from water. Many other objects and advantages of the present invention will appear more fully hereinafter.

In the accompanying drawing Fig. 1 is a flow diagram of my improved method of separating acetylsulfanilylchloride from water with which it is wet and of preparing a solution thereof in a selected ketone solvent for use in the condensation and Fig. 2 is a similar diagram of the manufacture of acetylsulfanilylguanidine and of sulfaguanidine in accordance with my invention.

I have now found unexpectedly that if a ketone having the general formula $$CH_3-\overset{O}{\underset{\|}{C}}-R$$

where R is a $C_2$ to $C_4$ alkyl or alkenyl group is used in conjunction with concentrated aqueous alkali metal hydroxide solution, as the reaction medium, the condensation of guanidine with p-acetylsulfanilylchloride to form p-acetylsulfanilylguanidine in increased yield, often as high as approximately 90 percent based on the guanidine, can be readily effected. The increase in yield as a result of the use of such ketones in conjunction with concentrated aqueous alkali in accordance with my invention appears to be attributable to the fact that very little by-product bis-(acetylsulfanilyl)-guanidine is formed. This is a novel and unexpected result for which it is difficult to propose any specific reason. Other organic liquids which were tried such as ethylene dichloride or toluene were found to be wholly unsatisfactory since no sulfonamide was formed, the product formed when these other solvents were used being guanidinium acetylsulfanilate. When acetone is used, an objectionable amount of the bis-(acetylsulfanilyl)-guanidine is formed.

The ketones used in accordance with the present invention are normally liquid ketones, i. e., are liquid at ordinary temperatures such as temperatures of from 10° to 30° C. used in carrying out the condensation step of my invention, and boil below 60° C. at 20 mm. pressure so that they can be removed readily by fractional distillation of the reaction mixture as shown below. The three most highly preferred ketones for use in my invention are methyl ethyl ketone, methyl isobutyl ketone and mesityl oxide. The ketones used in practicing my invention are characterized by being relatively immiscible with water and by being immiscible with the aqueous alkali metal hydroxide solution used in the process. I prefer to employ those ketones answering to the above description which are unsubstituted, i. e., which are free from substitution with other groups. The ketones used in practicing my invention are inert with respect to the other materials present in the reaction mixture.

The following dialkyl ketones are useable in the practice of my invention: Methyl ethyl ketone, methyl n-propyl ketone, methyl isopropyl ketone, methyl n-butyl ketone, methyl isobutyl ketone, methyl sec-butyl ketone and methyl tert-butyl ketone. The following ketones exemplify those wherein R in the formula $$CH_3-\overset{O}{\underset{\|}{C}}-R$$

is alkenyl; mesityl oxide (methyl isobutenyl ketone), methyl vinyl ketone, methyl allyl ketone and methyl crotyl ketone. R in the formula may be any $C_2$ to $C_4$ alkyl or alkenyl group.

I have found that it is feasible and in fact highly advantageous, when using concentrated alkali metal hydroxide and the above described ketones, to employ a molar excess of the acetylsulfanilylchloride. I have found that the yields of product are higher and more reproducible when such an excess of acetylsulfanilylchloride is employed. The amount of such excess may range up to 30 percent. In practice I generally employ a molar ratio of p-acetylsulfanilylchloride to guanidine of from 1.1:1 to 1.3:1. The improved results obtained by the use of such an excess are in marked contrast to the prior art manufacture of sulfanilylguanidine since when acetone is employed it is necessary to limit the amount of acetylsulfanilylchloride used in order to avoid formation of the by-product bis-(acetylsulfanilyl)-guanidine as much as possible.

The amount of the selected ketone used in practicing my invention may vary widely. I generally use such relative proportions of ketone and aqueous alkali that the ketone phase of the reaction mixture is larger than the aqueous phase. I prefer to employ the ketone in an amount such that the volume ratio of the ketone phase to the aqueous phase ranges from 2:1 to 4:1. Because of the immiscibility of the aqueous concentrated alkali solution and the ketone in one another, use of the ketone and of the aqueous alkali metal hydroxide solution in the relative proportions just mentioned produces a reaction mixture wherein ketone phase and the aqueous phase are present in substantially corresponding relative proportions.

The concentration of the aqueous alkali used in practicing my invention should be high, i. e., at least 20 percent by weight ranging therefrom upwardly to 30 percent by weight. Use of this high concentration of alkali metal hydroxide depresses the ionization of the guanidine. If the guanidine is permitted to ionize in dilute aqueous alkali to form guanidinium ion, then the reaction product is guanidinium acetylsulfanilate. While any alkali metal hydroxide may be employed in practicing my invention, I usually employ sodium hydroxide.

As is well-known, the acyl group on the sulfanilylchloride condensed with the guanidine is usually acetyl although it may be any other lower fatty acid group having not more than four carbon atoms or may even be benzoyl.

Any suitable form of guanidine may be employed in practicing my invention. I almost invariably use guanidine in the form of a suitable guanidine salt, such as guanidine nitrate. The selection of a suitable form of the guanidine does not per se constitute any part of the present invention. In carrying out the condensation of the acetylsulfanilylchloride with the guanidine, I usually employ a considerable molar excess of alkali metal hydroxide over the guanidine, the molar ratio of alkali metal hydroxide to guanidine generally being from 2:1 to 4:1.

I generally carry out the condensation by forming in any suitable way a mixture of the guanidine salt, the aqueous sodium hydroxide solution and a part or all of the selected ketone, and adding with agitation and maintenance of the temperature at between 10° and 30° C., the p-acetylsulfanilylchloride over a substantial period. The acetylsulfanilylchloride may be in any suitable form. Usually it is added gradually either as a dry powder or as a solution in a portion of the ketone sufficient to dissolve the same.

However, with the small aqueous phase and the large ketone phase, the agitation is not always entirely satisfactory since the acetylsulfanilylguanidine which precipitates during the reaction often tends to cling to the sides of the vessel occluding unreacted guanidine and acid chloride. I have found, however, that this difficulty may be avoided by the slow addition of a limited amount of water after the acid chloride has been added and allowed to react with stirring, the addition of such additional water being commenced after a suitable period of time has elapsed following completion of the addition of the acid chloride; by proceeding in this manner the precipitated material which clings to the sides of the vessel is removed. Only sufficient additional water should be added in this manner to effect this result and the addition of the water should be made slowly with stirring to obtain the maximum benefit of the water added. Preferably addition of this water is not commenced until at least 20 minutes have elapsed following completion of addition of acid chloride to the reaction mixture. The additional water may be added gradually in any desired manner, either continuously or portionwise, portionwise addition generally being more convenient in a batch type of operation. The amount of water added in this manner may vary widely but preferably ranges from 50 percent to 300 percent by volume based on the volume of the ketone present in the reaction mixture. The reaction mixture is stirred during and often following addition of the water, over a period of time which may range from 30 minutes to 3 hours after initiation of the addition of the water.

The acetylsulfaguanidine appears as a precipitate in the resulting reaction mixture and may be recovered therefrom in any suitable manner. At the present time the standard method used for the manufacture of sulfaguanidine involves the isolation of the intermediate acetylsulfaguanidine formed by the condensation of guanidine and acetylsulfanilylchloride. Unfortunately the acetylsulfanilylguanidine intermedate is formed in a state of very fine subdivision so that separation in conventional manner from the mother liquor as by filtration is very slow and difficult.

However, I have found a method whereby the difficulty of separation of the intermediate acetylsulfaguanidine is circumvented. I have found that there is no need to isolate this intermediate but that the reaction mixture may be treated to remove the ketone and thence carried through the hydrolysis stage in which the acetyl group is removed by hydrolysis to give the desired product sulfaguanidine. In this way the considerable labor and equipment which would be required to effect the filtration of the acetylsulfaguanidine are obviated. My method also obviates the necessity for the storage of the intermediate and its reloading into a reaction vessel wherein the hydrolysis is to be carried out. I have found a method of conducting the hydrolysis in the same reaction vessel as that wherein the condensation of the acid chloride with the guanidine was effected.

Avoidance of the necessity of isolating the acetylsulfaguanidine by my method has a number of other advantages. I have found that the ketones employed may be recovered from the reaction mixture to an extent of more than 90 percent by simply applying a partial vacuum to the reaction vessel after the condensation of guanidine and acetylsulfanilylchloride and distilling off the ketone with stirring and heating of the reaction mixture to a temperature below 60° C. and preferably from 40° to 50° C. The vacuum is so adjusted that the reaction mixture has the foregoing temperature and that the ketone distills freely. The presence of water in the mixture undergoing distillation appears to expedite removal of the ketones therefrom, since the ketones form azeotropes with water, which azeotropes boil considerably below the ketones. By proceeding in the foregoing manner, the ketone which forms a considerable part of the raw material cost of the process can be readily recovered for re-use and in this way costs can be greatly reduced. Furthermore, if it were attempted to first filter off the acetylsulfaguanidine, the recovery of ketone would be rendered considerably more difficult since the mother liquor would be diluted with wash water and much larger volumes would require distillation. Additional equipment would be required in such case for the storage and the distillation and the recovery of the ketone would not be as great because of the additional handling and the decrease in the efficiency of recovery attributable to the increased volume as a result of the dilution. Another advantage of proceeding in the foregoing manner and using the reaction mixture containing the acetylsulfaguanidine directly for the hydrolysis is that there is a saving of sodium hydroxide since the excess of sodium hydroxide which was used in the condensation of guanidine and acetylsulfanilylchloride is made use of in the hydrolysis. In a two-step process, this sodium hydroxide would be lost in the mother liquors. Another advantage is that there is no heat loss after the recovery of the ketone since the warm reaction mixture can be used directly for the hydrolysis, whereas if the acetylsulfaguanidine is filtered off and the solvent is recovered from the mother liquors, the heat in the mother liquors is lost. Another advantage is the considerable saving in time for each batch of sulfaguanidine because of the elimination of several operations; this increases considerably the productivity of the plant.

Following distillation of the ketone, the hydrolysis of the acetylsulfaguanidine is carried out, preferably by adding additional water and sodium hydroxide and heating with agitation at 60° to 80° C. for from 1 to 3 hours.

The relative amounts of sodium hydroxide and water present in the mixture undergoing hydrolysis are not especially critical. The amounts of water and of sodium hydroxide added to the reaction mixture at this point preparatory to effecting the hydrolysis may conveniently be such that there is present in the hydrolysis mixture a total of 2.5 to 7.0 moles free NaOH and a total of from 1000 to 2000 cc. of water per mole of acetylsulfanilylquanidine. The excess of sodium hydroxide remaining after the condensation of guanidine and acetylsulfanilylchloride can readily be calculated since each mole of the latter uses up one mole of sodium hydroxide and each mole of guanidine nitrate uses up one mole of sodium hydroxide. With the lower quantity of alkali the reaction time for the hydrolysis should be increased in order to carry the hydrolysis to completion. The concentration of the alkali solution present in the hydrolysis mixture may vary from 10 to 20% sodium hydroxide. The quantity of water present should be such to insure good stirring which may require a weight ratio of solution of sodium hydroxide to acetylsulfanilylchloride of from 4:1 to 8:1.

The temperature at which the hydrolysis is conducted is much more critical than the amounts of alkali and water. I generally use a temperature of from 60 to 80° C. and prefer to use a temperature of from 65 to 75° C. The hydrolysis time may range from 1 to 6 hours but I prefer to so adjust the conditions that hydrolysis is completed in from 1 to 2 hours.

Following the hydrolysis step, the precipitated sulfaguanidine product is recovered from the resulting reaction mixture in any suitable manner, usually by cooling to room temperature and filtering. I find it desirable to filter off the sulfaguanidine shortly after cooling to room temperature since in some cases a byproduct precipitates upon prolonged standing of the hydrolyzed mixture. The sulfaguanidine prepared according to my invention is satisfactory in its crude state to be employed as a raw material for the manufacture of other sulfa drugs, i. e., sulfamerazine, sulfamethazine and sulfadiazine. If a U. S. P. grade is desired, the crude product can be readily purified by crystallization from water or other solvents in a known manner.

As disclosed above, the condensation of guanidine and acetylsulfanilylchloride takes place best in concentrated sodium hydroxide. Acetylsulfanilylchloride is usually made by the treatment of acetanilide with chlorosulfonic acid and subsequent drowning in ice water. The precipitated acetylsulfanilylchloride is then separated and washed. This crude acetylsulfanilylchloride contains a large quantity of moisture and has a pasty consistency; the moisture content may be as high as 75%. Because of this the use of this very wet material may dilute the aqueous solution of guanidine and sodium hydroxide to such an extent as to greatly decrease the yield of acetylsulfaguanidine.

A number of methods can be used to circumvent the above difficulty. The acetylsulfanilylchloride can be separated by centrifuging and then oven drying at 25°. This method has the disadvantage of requiring an expensive centrifuge that is corrosion resistant to hydrochloric acid. Furthermore there is considerable labor and equipment required in the oven drying. Care must be taken in the oven drying of the crude material since there is a strong possibility of decomposition.

The prior art makes use of the method of dissolving the crude acid chloride in ether, separation of the water and subsequent precipitation by another organic liquid such as benzene. However, this method is not satisfactory on a commercial scale because of the multiplicity of operations, the hazard involved in the use of diethyl ether, the loss on recovery and separation of the solvents and the loss of acid chloride due to the solvents employed.

Good solvents for acetylsulfanilylchloride are not numerous. The prior art refers to acetone as such a solvent and acetone has been used for the purification of crude acetylsulfanilylchloride. The crude material is dissolved in the acetone and reprecipitated with water. However, only about 75 percent of the crude material is recovered.

I have discovered, however, that ketones of the type described above are very good solvents for acetylsulfanilylchloride in a water-wet condition and may be employed to effect removal of water from wet acetylsulfanilylchloride and preparation of a solution thereof useable directly in the condensation process described above whereas acetone which is water-soluble is not satisfactory for this purpose. When the ketones of the types enumerated above especially methyl ethyl ketone, methyl isobutyl ketone and mesityl oxide, are stirred with water-wet acetylsulfanilylchloride and preferably although not necessarily with a water-soluble inorganic salt, typified by sodium chloride or sodium sulfate, the resulting mixture separates into an aqueous layer and a ketone layer containing the acid chloride. If such a salt is used it goes into solution in the aqueous phase. The ketone layer can be readily separated from the aqueous layer and used directly for the condensation of guanidine and acetylsulfanilylchloride. The amounts of the ketone and the water-soluble inorganic salt, where used, employed to effect removal of water in this way may vary quite widely but should be sufficient to achieve separation of at least 90 percent and preferably as nearly 100 percent as possible of the water from the acid chloride. The amount of the ketone used should be sufficient to dissolve all of the acid chloride. The amount of the sodium chloride, sodium sulfate or the like should be sufficient to break up any emulsions and permit rapid settling of the mixture into two layers. It also serves to reduce the solution of the ketone in the aqueous phase with resulting loss thereof. In practice I prefer to employ an amount of the ketone at least equal to the weight of the acid chloride (calculated on the dry basis) and still more preferably I use an amount of ketone equal to at least twice the weight of acid chloride. The amount of the water-soluble inorganic salt employed may range from 5 to 20 percent of the water in the wet acid chloride but preferably is not so great that undissolved salt is present after the attainment of equilibrium. The temperature used to effect removal of water is generally substantially atmospheric, i. e., from 10° to 30° C. The use of acetone or diethyl ether as a solvent for the preliminary removal of water from acetylsulfanilylchloride is not satisfactory because these organic liquids are not good reaction media for the condensation reaction. In any case, acetone is water-soluble and hence could not be used as a drying means. The use of the relatively water-immiscible ketones of my invention, typified by methyl ethyl ketone, methyl isobutyl ketone and mesityl oxide, is highly advantageous advantageous because these ketones are excellent solvents for the acid chloride, are superior reaction media for the condensation reaction and since they are relatively water-insoluble they can be used effectively for removing moisture from the wet acid chloride. The use of these relatively water-immiscible ketones for the preliminary removal of water from the acetylsulfanilylchloride has the further advantage that the resulting solution in the ketone enables the addition of the acid chloride to be made more conveniently and uniformly, leading to better results in the condensation. Since the relatively water-immiscible ketones are used as reaction media when carrying out the condensation in the manner described above, there is no difficulty such as would be encountered in the use of more than one organic solvent and the need for separation of two solvents is obviated.

I have found that the quality of the acetylsulfanilylchloride has an important effect on the yield of the acetylsulfaguanidine. Since the acetylsulfanilylchloride is unstable, especially in a crude or wet state, it is advisable to use it as soon as possible in the condensation reaction. If, for any reason, use of the acid chloride within a short time is not feasible, it is advisable to purify it in any suitable manner before storing it.

Since the ketones used in accordance with the present invention have a boiling point below 60° C. at 20 mm. and are removed by distillation at such low temperatures there will not be any tendency for condensation of the ketone in the alkali such as would occur at higher temperatures. Furthermore decomposition of the acetylsulfaguanidine beyond hydrolysis is avoided.

It will be understood that since the ketone is recovered by distillation, the reaction mixture will attain the temperature of the boiling point for the duration of the ketone recovery.

The accompanying drawing will be self-explanatory in the light of the foregoing description. As shown in Fig. 2, the step of separating the precipitated acetylsulfaguanidine is optional and as indicated above such separation is preferably omitted.

The following examples illustrate my invention in more detail.

*Example 1.—Preparation of acetylsulfaguanidine*

In a 500 cc. 3-necked flask equipped with a thermometer and an efficient stirrer, there was placed a solution of 24.0 g. (0.60 mole) sodium hydroxide pellets in 60 cc. water. To this was added 25.0 g. (0.205 mole) of guanidine nitrate and stirring was continued until solution was complete. To the aqueous solution there was added 190 cc. of methyl ethyl ketone and the mixture was cooled to 10° C. with stirring. Dry acetylsulfanilylchloride 60.0 g. (0.257 mole) three days old, was added over a period of twenty minutes, with stirring, keeping the temperature of 10° to 15° C. The reaction mixture became quite thick and was diluted with 200 cc. of water, thirty minutes after the completion of the addition of the acetylsulfanilylchloride; another lot of 150 cc. of water was added thirty minutes after the first lot and the stirring was stopped one and one-half hours after the completion of the acetylsulfanilylchloride addition. The product was filtered, washed with water till the washings were free of alkali and dried in the oven at 70° C. The yield was 46.7 g. or 89 percent of theory, M. P. 250° to 5° C.

*Example 2.—Preparation of acetylsulfaguanidine*

In a 500 cc. 3-necked flask equipped with a thermometer and an efficient stirrer, there was placed a solution of 19.2 g. (0.48 mole) of sodium hydroxide pellets and 20.0 g. (0.164 mole) of guanidine nitrate in 50 cc. of water. After adding 160 cc. of methyl isobutyl ketone and cooling to 10° C. there was added 48 g. of acetylsulfanilylchloride M. P. 149° C., over a period of thirty minutes, keeping the temperature at 10° to 15° C. Four lots of water of 50 cc., 50 cc., 100 cc. and 200 cc. were added forty-five min., one hundred and five min., one hundred and sixty-five min., and one hundred and ninety-five minutes after completing the addition of the acetylsulfanilylchloride. The solid product was filtered off, washed free of alkali and dried in the oven at 70° C.; the yield was 42.2 g. or 91 percent of theory M. P. 248° to 250° C. The filtrate was acidified to determine if any bis-(acetylsulfanilyl)-guanidine was present but no precipitate appeared.

*Example 3.—Preparation of sulfaguanidine*

To a 500 cc. 3-necked flask equipped with a good mechanical stirrer, and a thermometer, there was added a solution of 19.2 g. of pellet sodium hydroxide and 20.0 g. guanidine nitrate in 50 cc. of water and 160 cc. of methyl ethyl ketone. After the mixture was cooled to 10° C. 48 g. of acetylsulfanilylchloride was added over a period of thirty-five minutes with stirring, keeping the temperature at 10° to 15° C. Thirty minutes after the addition of the acetylsulfanilylchloride 50 cc. of water was added and this was repeated after another thirty minutes. After another fifty minutes the methyl ethyl ketone was distilled off at 100 mm. and to the residual slurry there was added a solution of 25 g. of pellet sodium hydroxide in 150 cc. of water. The hydrolysis was carried out at 70° to 73° C. with stirring for two hours. The reaction mixture was then cooled to room temperature over thirty minutes, filtered and washed with water. The sulfaguanidine was dried at 70° C. overnight, the yield being 26.5 g. or 75.5 percent of theory. In the mother liquor there appeared on standing 1.2 g. of white solid containing inorganic material and which did not melt up to 265° C. When this material was removed and the filtrate acidified to a pH of 2 to 3 there appeared 0.6 g. of yellowish material which decomposed gradually to a tar at 100° to 200° C.

*Example 4.—Preparation of sulfaguanidine*

The acetylsulfanilylchloride that was used was prepared twenty hours earlier; the sample was removed from the filter press and was quite wet since the charge was not air blown or dried in any way. From a determination it was found to contain 60 percent moisture. A portion of 120 g. of this wet acetylsulfanilylchloride was stirred with 110 cc. of methyl ethyl ketone and 10 g. of sodium chloride until all the acetylsulfanilylchloride was dissolved. The mixture was then placed in a separatory funnel and an aqueous layer weighing 73 g. was removed. To a 500 cc. 3-necked flask equipped with an efficient air tight stirrer and a thermometer, there was added a solution of 19.2 g. of sodium hydroxide in 50 cc. water in which 20.0 g. of guanidine nitrate was dissolved. After adding 50 cc. of methyl ethyl ketone and cooling to 10° to 15° C. there was added from the separatory funnel the above prepared methyl ethyl ketone solution of acetylsulfanilylchloride over a period of thirty minutes keeping the temperature at about 15° C. Stirring was continued for thirty minutes after the addition was made and then 50 cc. of cold water was added. After another thirty minutes a further portion of 50 cc. of water was added and the stirring continued for another hour. In the third neck of the reaction flask there was placed a distillation head and the methyl ethyl ketone was distilled off with stirring bringing the waterbath temperature up to 50° C. and keeping the pressure at 110 mm.; the vapor temperature of the methyl ethyl ketone was found to be 30° to 35° C.; the methyl ethyl ketone receiver was kept cold with ice water. When the methyl ethyl ketone was removed there was added a solution of 24.0 g. of sodium hydroxide in 100 cc. water and the slurry was heated with stirring at 70° C. for ninety minutes. A test aliquot at the end of sixty minutes was completely soluble in cold dilute acid. At the end of the ninety minute period the mixture was cooled to 15° C. over a period of thirty minutes and filtered. The filtrate had no detectable odor of ammonia indicating little decomposition of the sulfaguanidine. The cake was washed free of alkali and dried in the oven at 70° C. overnight. The yield was 26.4 g. or 75 percent M. P. 184° C.

*Example 5.—Preparation of sulfaguanidine*

To a 500 cc. 3-necked flask equipped with a stirrer and a thermometer, there was added a solution of 19.2 g. of sodium hydroxide and 20.0 g. of guanidine nitrate in 50 cc. water, and then 150 cc. of mesityl oxide. After cooling to 10° C., 48.0 g. of acetylsulfanilylchloride was added over a period of twenty-five minutes. Twenty minutes after the addition of the acid chloride 50 cc. of water was added; this was repeated after another twenty minutes. After another forty minutes stirring the mesityl oxide was distilled off under vacuum recovering 134 cc. or about 90 percent of the original solvent used. To the remainder in the reaction flask there was added 100 cc. of water and a solution of 24 g. of sodium hydroxide in 50 cc. water. The mixture was stirred with heating for two hours at 70° to 78° C., allowed to cool and the sulfaguanidine was filtered off and washed free of alkali. The yield after drying at 70° C. was 63 percent of theory M. P. 186° C.

From the foregoing description many advantages of the present invention will be apparent to those skilled in the art. The principal advantage is that the process of the present invention improves the yield of acetylsulfaguanidine from around 70 percent to around 90 percent. This improvement in yield is effected primarily by the use of the selected ketones of the present invention and the use of an excess of the acetylsulfanilylchloride in the condensation with guanidine. Another advantage of the present invention is that it provides a much simplified process whereby the condensation of guanidine and acetylsulfanilylchloride and the hydrolysis of the acetylsulfaguanidine are conducted in a single continuous process which eliminates the isolation of the intermediate. This not only saves much labor, raw materials and equipment, but increases the productivity and avoids the difficulty of filtering off the very finely precipitated acetylsulfaguanidine which was a serious problem in prior art practice. The process described herein provides for the recovery of nearly all of the ketone used as the solvent, thereby greatly reducing costs. In addition the method described herein enables the removal of water from acetylsulfanilylchloride to be effected in a simple and economical manner. The removal of moisture from water-wet acetylsulfanilylchloride was a very serious problem until the method described herein was discovered.

Having thus described my invention, what I claim and desire to protect by Letters Patent is:

1. The process of producing p-acylsulfanilylguanidine which comprises reacting guanidine with the corresponding p-acylsulfanilylchloride in the presence of aqueous alkali metal hydroxide solution and a ketone having the general formula

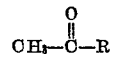

where R is a group selected from the class consisting of $C_2$ to $C_4$ alkyl and alkenyl groups.

2. The process of claim 1 wherein said ketone is methyl ethyl ketone.

3. The process of claim 1 wherein said ketone is methyl isobutyl ketone.

4. The process of claim 1 wherein said ketone is mesityl oxide.

5. A process as recited in claim 1 wherein said p-acylsulfanilylchloride is used in an amount such that the molar ratio thereof to guanidine is from 1.1:1 to 1.3:1.

6. The process of producing p-acetylsulfanilylguanidine which comprises forming a mixture of a guanidine salt, an aqueous alkali metal hydroxide solution having a concentration of from 20% to 30% by weight, the mole ratio of alkali metal hydroxide to guanidine salt being from 2:1 to 4:1, a ketone having the general formula

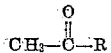

where R is a group selected from the class consisting of $C_2$ to $C_4$ alkyl and alkenyl groups, said ketone being used in amount such that the ratio of the volume of the ketone phase to the aqueous phase is from 2:1 to 4:1, and p-acetylsulfanilylchloride, the mole ratio of p-acetylsulfanilylchloride to guanidine salt being from 1.1:1 to 1.3:1, and maintaining the reaction mixture at a temperature of from 10° to 30° C. with agitation until p-acetylsulfanilylguanidine is formed.

7. A process as recited in claim 6 including the additional steps of gradually adding to the reaction mixture more water in an amount ranging from 50% to 300% by volume based on the volume of said ketone and stirring over a period of time of from 30 minutes to 3 hours to loosen the reaction mass and thus promote effective agitation.

8. A process as recited in claim 6 including the additional steps of recovering said ketone from the resulting reaction mixture by vacuum distillation of the entire reaction mixture at a temperature below 60° C. and subjecting the residual mixture obtained, without separation of the p-acetylsulfanilylguanidine, to hydrolysis with alkali metal hydroxide to convert the p-acetylsulfanilylguanidine to sulfaguanidine.

9. The process of producing sulfaguanidine which comprises reacting guanidine with p-acetylsulfanilylchloride in the presence of an aqueous alkali metal hydroxide solution and a ketone having the general formula

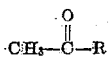

where R is a group selected from the class consisting of $C_2$ to $C_4$ alkyl and alkenyl groups, effecting said reaction at a temperature of from 10° to 30° C., recovering said ketone from the resulting reaction mixture by vacuum distillation of the entire reaction mixture at a temperature below 60° C., and adding additional water and alkali metal hydroxide to the residual mixture and heating with agitation at from 60° to 80° C. for from one to six hours to effect hydrolysis of the p-acetylsulfanilylguanidine to sulfaguanidine.

10. The process of claim 9 wherein said last-named step is conducted at a temperature of from 65° to 75° C.

11. The process of claim 9 wherein said last-named step is carried out in from one to two hours.

12. The process of making p-acetylsulfanilylguanidine which comprises admixing water-wet p-acetylsulfanilylchloride with a ketone having the general formula

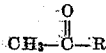

where R is a group selected from the classes consisting of $C_2$ to $C_4$ alkyl and alkenyl groups, allowing the resulting mixture to separate into an aqueous layer and a ketone layer, said ketone layer being a solution of p-acetylsulfanilylchloride in said ketone, separating said ketone layer from said aqueous layer, mixing said ketone layer with a guanidine salt and with an aqueous alkali metal hydroxide solution having a concentration of from 20 percent to 30 percent by weight, the reaction mixture containing ketone responding to the above definition in amount such that the ratio of the volume of the ketone phase to the aqueous phase is from 2:1 to 4:1, the mole ratio of alkali metal hydroxide to guanidine salt in the reaction mixture being from 2:1 to 4:1, the mole ratio of p-acetylsulfanilylchloride to guanidine salt being from 1.1:1 to 1.3:1, and maintaining the reaction mixture at a temperature of from 10° to 30° C. until p-acetylsulfanilylguanidine is formed.

13. The process of claim 12 wherein said ketone is methyl ethyl ketone.

14. The process of making sulfaguanidine which comprises carrying out the process of claim 12, recovering said ketone from the resulting reaction mixture by vacuum distillation of the entire reaction mixture at a temperature below 60° C., and subjecting the residual mixture obtained, without separation of the p-acetylsulfanilylguanidine, to hydrolysis with alkali metal hydroxide to convert the p-acetylsulfanilylguanidine to sulfaguanidine.

HENRY H. RICHMOND.

REFERENCES CITED

The following references are of record in the file of this patent:

UNITED STATES PATENTS

| Number | Name | Date |
| --- | --- | --- |
| 2,233,569 | Winnek | Mar. 4, 1941 |
| 2,301,000 | Winnek | Nov. 3, 1942 |
| 2,383,128 | Hultquist | Aug. 21, 1945 |